United States Patent
Rothman et al.

(10) Patent No.: US 10,751,693 B2
(45) Date of Patent: Aug. 25, 2020

(54) MINERAL RECOVERY USING HYDROPHOBIC POLYMER SURFACES

(71) Applicant: CIDRA Corporate Services Inc., Wallingford, CT (US)

(72) Inventors: Paul J. Rothman, Windsor, CT (US); Mark R. Fernald, Enfield, CT (US); Christian V. O'Keefe, Durham, CT (US); Douglas H. Adamson, Mansfield Center, CT (US)

(73) Assignee: CiDRA Corporate Service Inc., Wallingford, CT (US)

( * ) Notice: Subject to any disclaimer, the term of this patent is extended or adjusted under 35 U.S.C. 154(b) by 746 days.

(21) Appl. No.: 15/311,932

(22) PCT Filed: Jun. 1, 2015

(86) PCT No.: PCT/US2015/033485
§ 371 (c)(1),
(2) Date: Nov. 17, 2016

(87) PCT Pub. No.: WO2015/184436
PCT Pub. Date: Dec. 3, 2015

(65) Prior Publication Data
US 2017/0080403 A1    Mar. 23, 2017

Related U.S. Application Data

(60) Provisional application No. 62/004,999, filed on May 30, 2014.

(51) Int. Cl.
*B01J 20/26* (2006.01)
*C02F 1/28* (2006.01)
(Continued)

(52) U.S. Cl.
CPC ............ *B01J 20/261* (2013.01); *B01D 15/08* (2013.01); *B01J 20/262* (2013.01); *B01J 20/267* (2013.01);
(Continued)

(58) Field of Classification Search
CPC ...... B01J 20/261; B01J 20/267; B01J 20/262; B01J 20/28004; C02F 1/24; C02F 1/285;
(Continued)

(56) References Cited

U.S. PATENT DOCUMENTS 9,839,919 B2 * 12/2017 Davis ................. B03C 5/02
2003/0015428 A1   1/2003 Becker et al.
(Continued)

FOREIGN PATENT DOCUMENTS

WO    2009010422 A1    1/2009
WO    2012162593 A1    8/2010
(Continued)

OTHER PUBLICATIONS

English language Abstract of WO2009010422.

*Primary Examiner* — Haytham Soliman
(74) *Attorney, Agent, or Firm* — Ware, Fressola, Maguire & Barber LLP

(57) ABSTRACT

Apparatus or recovering a mineral particle of interest from a slurry in a mineral extraction process, featuring a core or substrate; and multiple layers arranged on the core or substrate, each layer of the multiple layers configured with a respective outer surface having a plurality of molecules attached thereto, the molecules comprising a functional group selected for attracting and attaching one or more mineral particles of interest to the molecules. Each layer is made from a polymer having a thickness of less than or (Continued)

Engineered Bead having Layers Less Than or Equal to About 125 microns equal to about 125 microns. The polymer is selected from a group consisting of polydimethylsiloxane or dimethyl siloxane.

21 Claims, 6 Drawing Sheets

(51) Int. Cl.
    *C02F 1/24*     (2006.01)
    *B01D 15/08*     (2006.01)
    *B01J 20/28*     (2006.01)
    *C02F 103/28*     (2006.01)
    *C02F 103/10*     (2006.01)

(52) U.S. Cl.
    CPC ........... *B01J 20/28004* (2013.01); *C02F 1/24* (2013.01); *C02F 1/285* (2013.01); *C02F 1/288* (2013.01); *C02F 2103/10* (2013.01); *C02F 2103/28* (2013.01)

(58) Field of Classification Search
    CPC .. C02F 1/288; C02F 2103/10; C02F 2103/28; B01D 15/08
    USPC .......................................... 502/402; 210/263
    See application file for complete search history.

(56) References Cited

U.S. PATENT DOCUMENTS

| | | |
|---|---|---|
| 2006/0134152 A1 | 6/2006 | Prouzet et al. |
| 2009/0206040 A1 | 8/2009 | Berg et al. |
| 2010/0200510 A1 | 8/2010 | Domke et al. |
| 2014/0339172 A1 | 11/2014 | Rothman |

FOREIGN PATENT DOCUMENTS

| | | | | |
|---|---|---|---|---|
| WO | 2012162593 A2 | 11/2012 | | |
| WO | 2013112240 A1 | 8/2013 | | |
| WO | 2013177267 A1 | 11/2013 | | |
| WO | 2013177267 A1 | 11/2013 | | |
| WO | WO-2013177267 A1 * | 11/2013 | ............... | B03C 5/02 |
| WO | 2014068142 A1 | 5/2014 | | |

\* cited by examiner

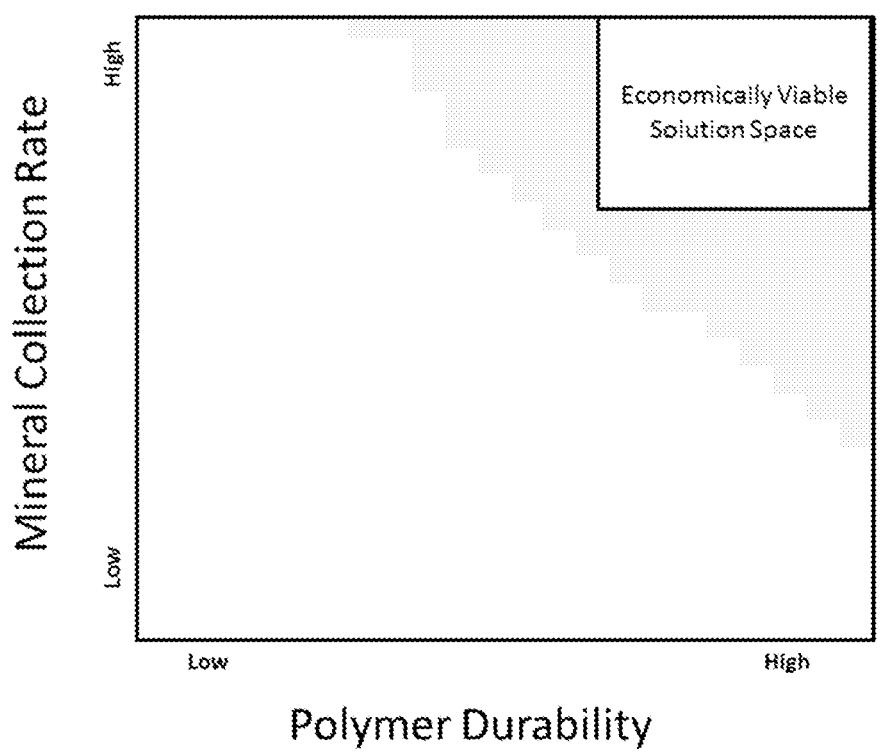
Figure 1: Graph of Mineral Collection Rate (Low to High) versus Polymer Durability (Low to High)

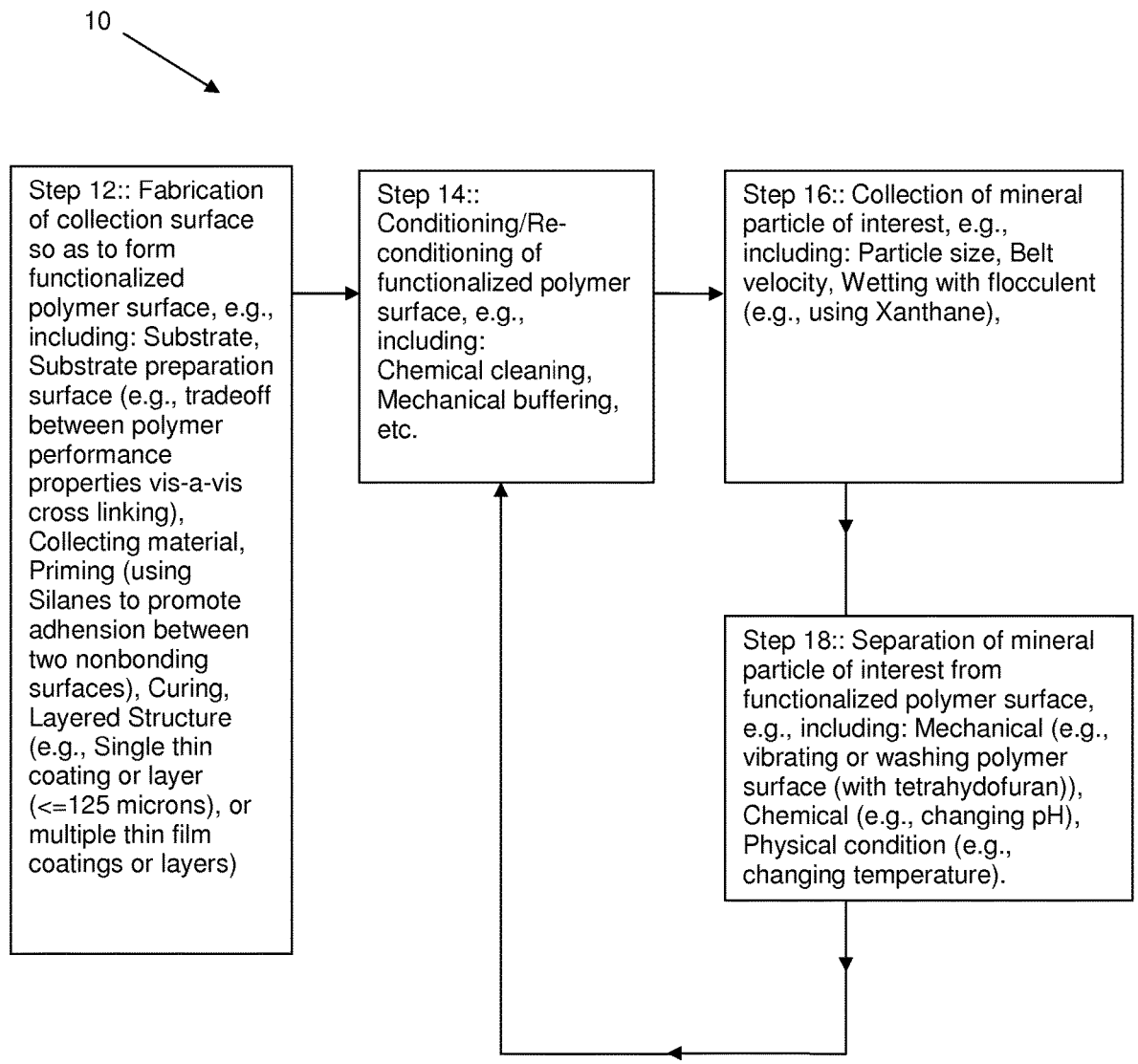
Figure 2: Example of Steps in the Mineral Extraction Process

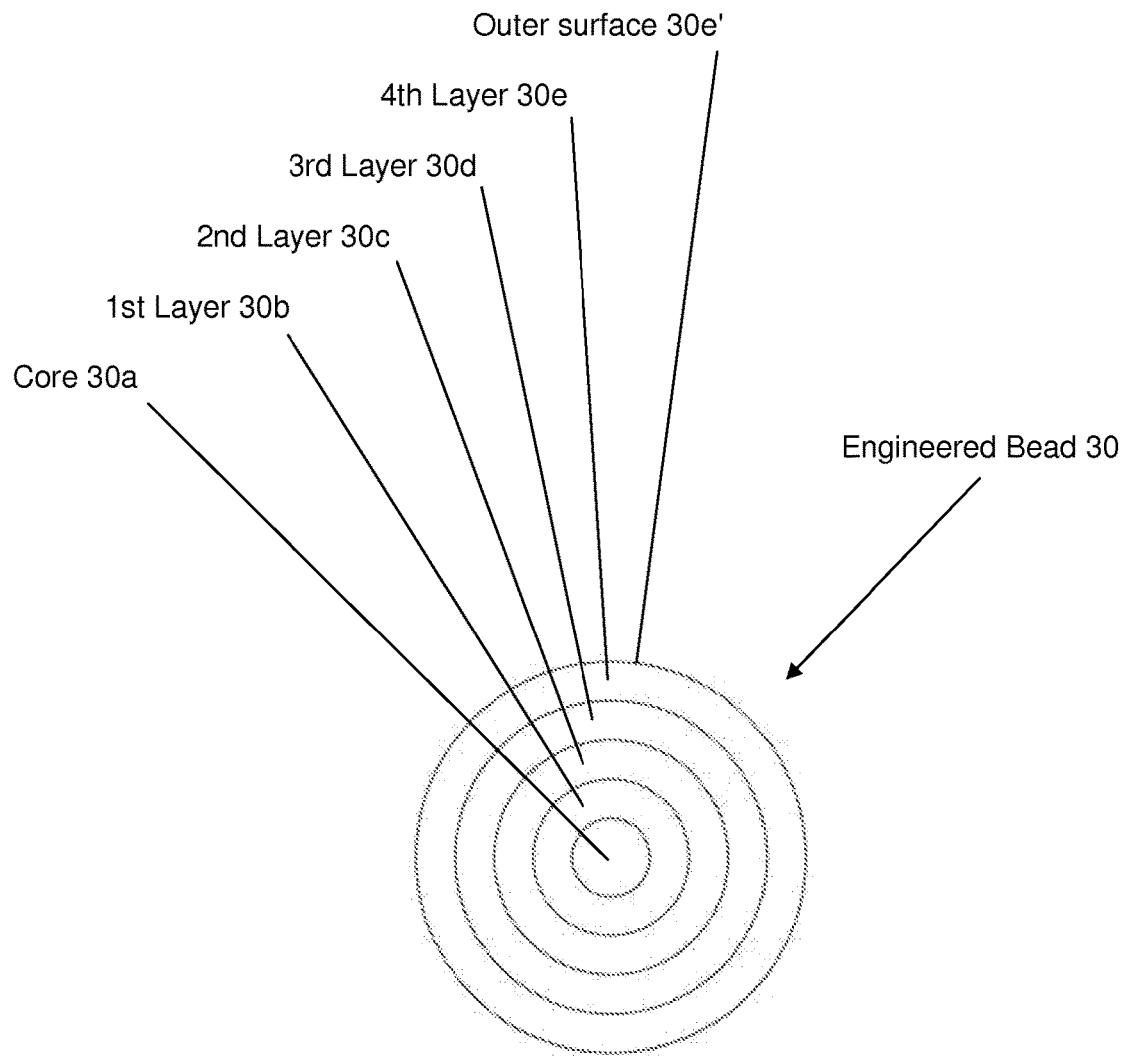
Figure 3A: Engineered Bead having Layers Less Than or Equal to About 125 microns

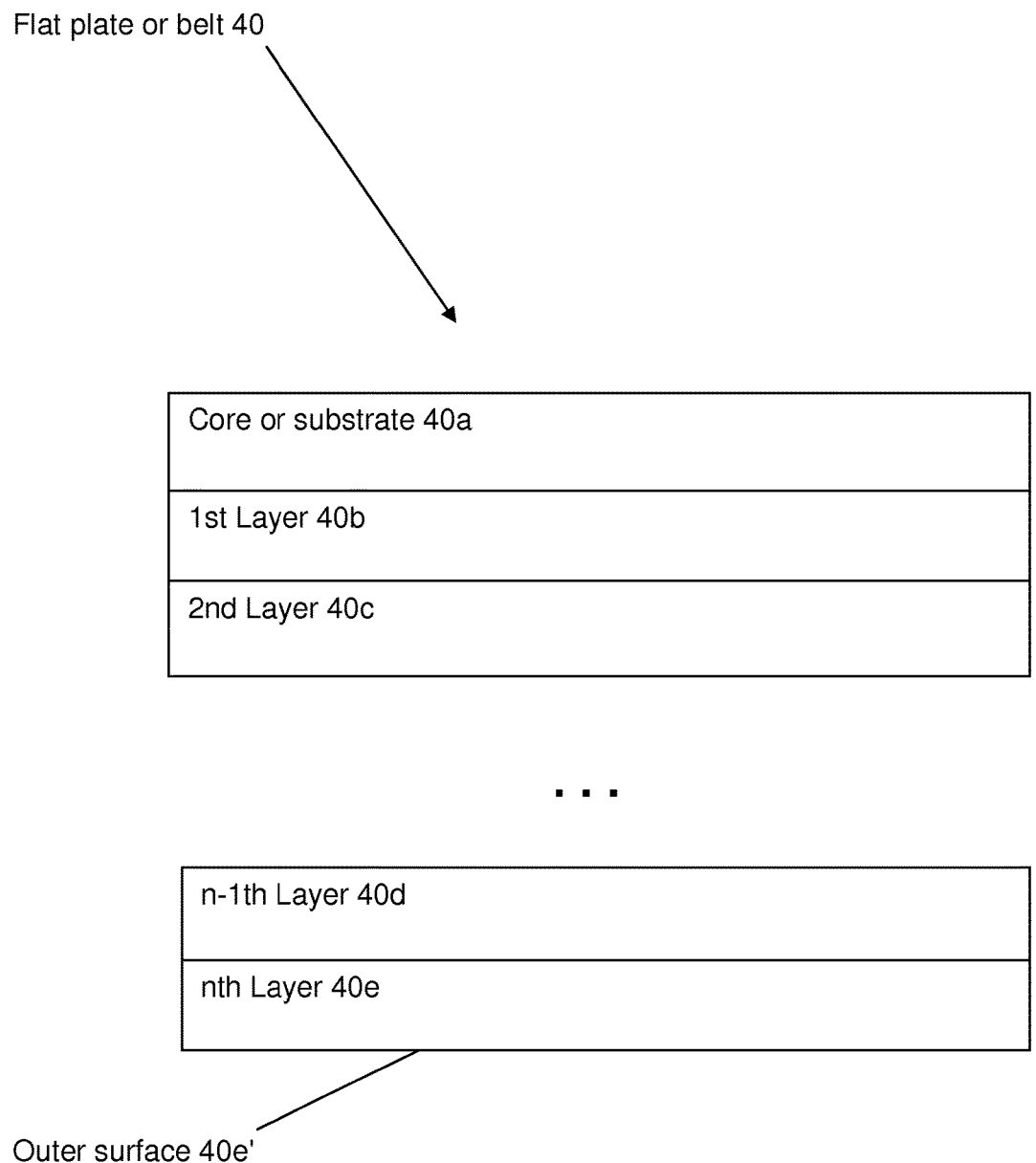
Figure 3B: Flat Plate or Belt having Layers Less Than or Equal to About 125 microns

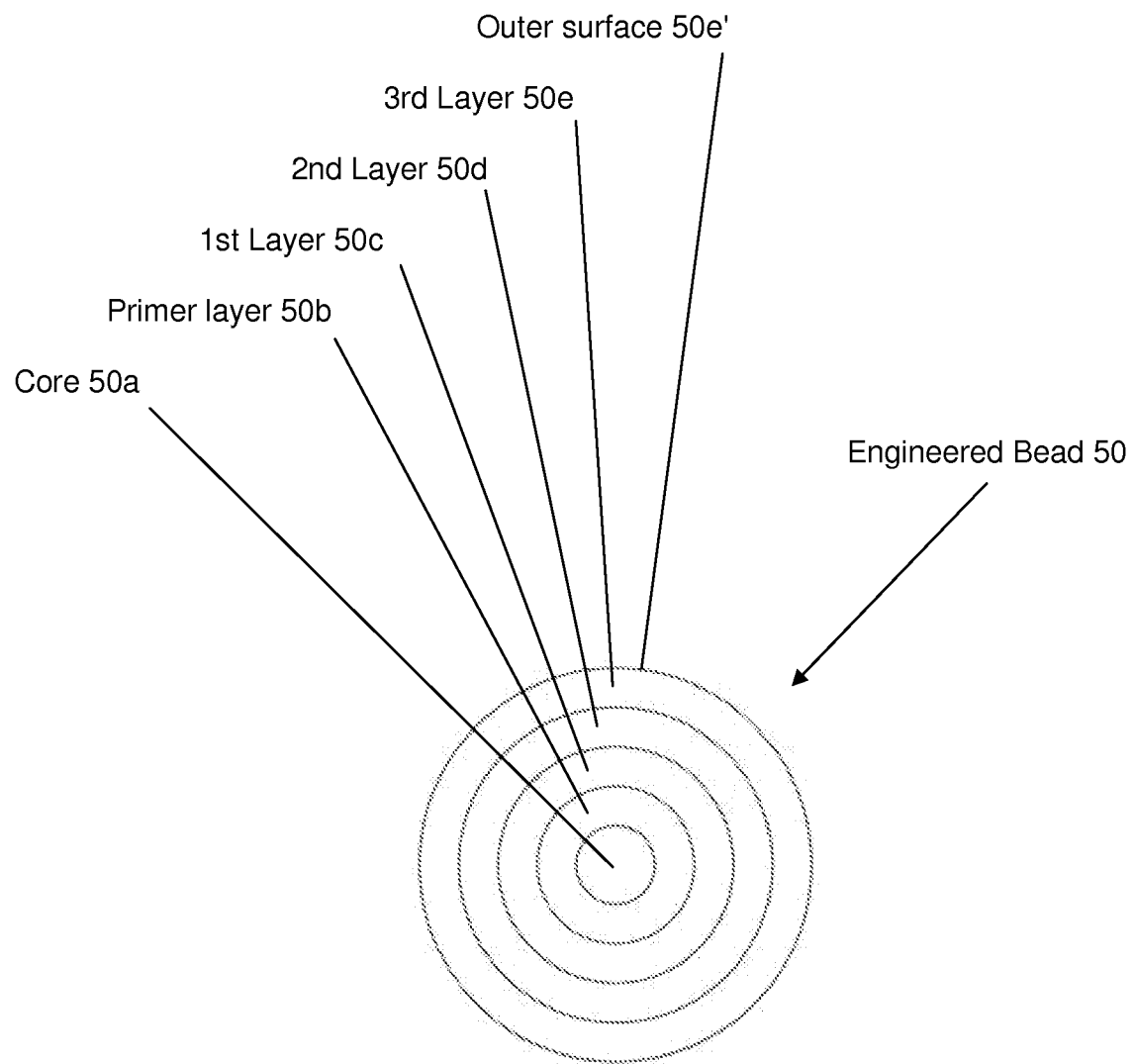
Figure 4A: Engineered Bead having Primer Layer 50b
Between Core 50a and 1st layer 50c

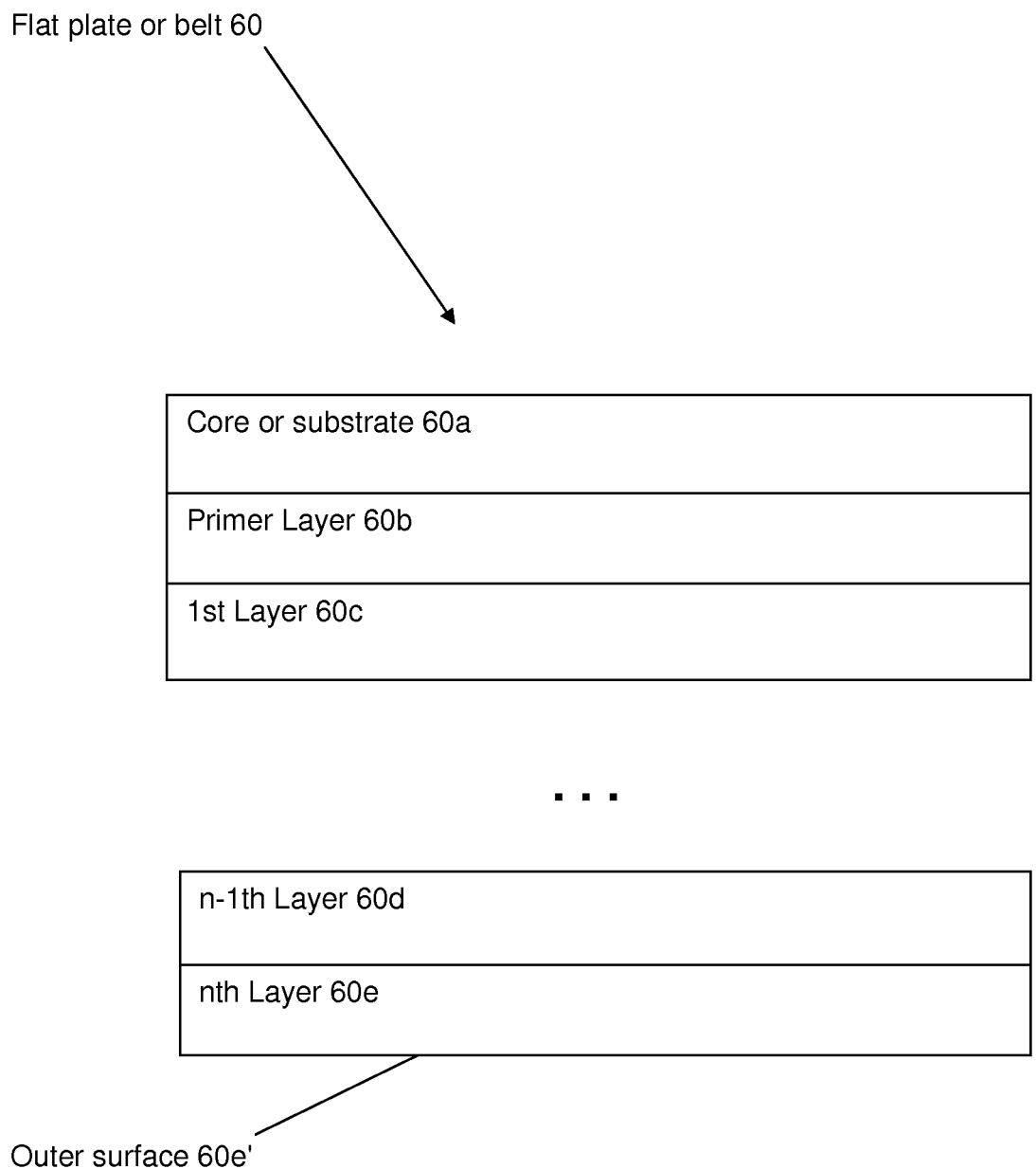
Figure 4B: Flat Plate or Belt 60 having Primer Layer 60b Between Core or Substrate 60a and 1st layer 60c

MINERAL RECOVERY USING HYDROPHOBIC POLYMER SURFACES

CROSS-REFERENCE TO RELATED PATENT APPLICATIONS

The present application claims the benefit of U.S. Provisional Patent Application No. 62/004,999, filed 30 May 2014, which is incorporated by reference herein in its entirety.

This application is also related to a family of nine PCT applications, which were all concurrently filed on 25 May 2012, as follows:

PCT application no. PCT/US12/39528, entitled "Flotation separation using lightweight synthetic bubbles and beads,"

PCT application no. PCT/US12/39524, entitled "Mineral separation using functionalized polymer membranes;"

PCT application no. PCT/US12/39540, entitled "Mineral separation using sized, weighted and magnetized beads;"

PCT application no. PCT/US12/39576, entitled "Synthetic bubbles/heads functionalized with molecules for attracting or attaching to mineral particles of interest;"

PCT application no. PCT/US12/39591, entitled "Method and system for releasing mineral from synthetic bubbles and beads;"

PCT application no. PCT/US/39596, entitled "Synthetic bubbles and beads having hydrophobic surface;"

PCT application no. PCT/US/39631, entitled "Mineral separation using functionalized filters and membranes;"

PCT application no. PCT/US12/39655, entitled "Mineral recovery in tailings using functionalized polymers;" and PCT application no. PCT/US12/30658, entitled "Techniques for transporting synthetic beads or bubbles in a flotation cell or column," all of which are incorporated by reference in their entirety.

This application also related to PCT application no. PCT/US2013/042202, filed 22 May 2013, entitled "Charged engineered polymer beads/bubbles functionalized with molecules for attracting and attaching to mineral particles of interest for flotation separation," which claims the benefit of U.S. Provisional Patent Application No. 61/650,210, filed 22 May 2012, which is incorporated by reference herein in its entirety.

This application is also related to PCT/US2014/037623, filed 13 May 2014, entitled "Polymer surfaces having a siloxane functional group," which claims benefit to U.S. Provisional Patent Application No. 61/822,679, filed 13 May 2013, as well as U.S. patent application Ser. No. 14/118,984, filed 27 Jan. 2014, and is a continuation-in-part is PCT application no. PCT/US12/39631, filed 25 May 2012, which are all hereby incorporated by reference in their entirety.

This application also related to PCT application no. PCT/US13/26303, filed 28 Feb. 2013, entitled "Method and system for flotation separation in a magnetically controllable and steerable foam," which is also hereby incorporated by reference in its entirety.

BACKGROUND OF THE INVENTION

1. Technical

This invention relates generally to a method and apparatus for separating valuable material from unwanted material in a mixture, such as a pulp slurry.

2. Description of Related Art

By way of example, in many industrial processes flotation may be used to separate valuable material from unwanted material. In this process a mixture of water, valuable material, unwanted material, chemicals and air is placed into a flotation cell. The chemicals are used to make the desired material hydrophobic, and the air is used to carry the material to the surface of the flotation cell. When the hydrophobic material and the air bubbles collide, they become attached to each other. The bubble rises to the surface carrying the material with it.

The performance of the flotation cell is dependent on the bubble surface area flux in the collection zone of the cell. The bubble surface area flux is dependent on the size of the bubbles and the air injection rate. Controlling the bubble surface area flux has traditionally been very difficult. This is a multivariable control problem, and there are no dependable real time feedback mechanisms to use for control.

The mineral recovery of such a process can be highly dependent on the mineral particle size distribution entering the flotation cell. Typically, coarse and fine particles recovery can be significantly less than the optimal particle size. Mining operations routinely discharge large well liberated particles to the tailings pond.

In contrast to the aforementioned flotation process using air bubbles, the assignee of the present invention has designed an alternative machine and process for recovering valuable minerals from mineral rich pulp slurry, e.g., consistent with that set forth in the aforementioned family of applications. This mineral rich pulp slurry could be any type of slurry being air conveyed ground minerals or an aqueous mixture for example. This mineral rich slurry is put into contact with a functionalized polymer surface which has been engineered to attract the mineral of interest. The surface could be anything from an engineered bubble to a flat plate. After the functionalized polymer surface attaches to the mineral of interest, the unwanted material is washed away and only the desirable mineral is left on the functionalized polymer surface. The enriched surface is then treated so that the mineral is released and collected. The functionalized polymer surface can then be reused.

SUMMARY OF THE INVENTION

One ongoing challenge being addressed by the assignee of the present invention is to design a functionalized surface that has maximum surface area and yet will survive in an industrial environment. Therefore, the functionalized surface must be strong, wear resistant, and be able to pass large amount of rejected solids while capturing the value material. It is generally understood that polymers that are more cross linked will be more durable, while polymers that are less cross linked will be less durable vice versa.

In particular, the functionalized surface may take the form of a hydrophobic polymer surface, e.g., consistent with that set forth below:

Mineral Recovery Using Hydrophobic Polymer Surface

Two typical metrics to evaluate mineral processing systems may include grade and recovery. The assignee of the present has demonstrated high grade mineral recovery using a hydrophobic polymer surface, e.g., consistent with that set forth in the aforementioned family of applications. The grade of the recovery is measured by the ability of the surface to reject gangue material and select only the valuable mineral. Recovery is understood herein to be a measure of what percentage of available mineral is actually recovered. An ideal mineral processing system would offer 100% recovery and produce the highest grade concentrate possible.

In addition, recovery rate is a third important metric that has a large impact on infrastructure costs. Recovery rate is understood to dictate the overall size requirements of a system to achieve a specified recovery. This is true because the size of a system designed for a specified recovery at a specified throughput will be based on the recovery rate. For example, the slower the recovery rate, the larger the system must be to achieve the desired results, while the faster the recovery rate, the smaller the system may be to achieve the desired results. The recovery rate, or residence time, may be determined by the rate of mineral recovery per volume unit time, which in turn is driven by a number of process factors, e.g., including the following:

Surface area—The available surface area for the mineral attachment. The more surface area per unit volume, the greater the rate of recovery.

Probability of attachment: The higher the probability of mineral attachment the greater the rate of recovery. By controlling specific surface properties of the polymer high probabilities of attachment can be achieved.

Probability of detachment: The lower the probability of mineral detachment the greater the rate of recovery. By controlling specific surface properties of the polymer lower probabilities of detachment can be achieved.

Rate of mineral presentation to the belt: The higher the rate mineral is presented to the belt, the faster the mineral can be recovered from the process.

Belt velocity: Higher recovery rates can be achieved at higher belt velocities provided recovery is not limited by presentation of the mineral to the belt. It should be noted that the belt velocity can be controlled over a wider and more accurate range than the rise time of a bubble.

Particle size: Larger mineral particles will have a higher mass to projected surface area ratio. This means for a given polymer belt surface area, a higher recovery rate will be realized with larger particles.

Liberation: The higher the liberation of the mineral the higher the probability of attachment.

With this backdrop, the present invention set forth herein provides new and unique techniques that may be implemented alone or in combination with that set forth in the aforementioned family of applications.

Importance of Polymer Crosslinking for Mineral Separation Using Functionalized Polymer According to some embodiments, the present invention provides a means to evaluate and control the tradeoff between the polymer's mineral collection capability and the polymer's durability, consistent with that set forth herein. The more the polymer is cross linked the more durable the material but the less it will capture mineral particles. Likewise, the less cross linked the polymer the more likely it will be to collect mineral particles but it will be less durable. The ability to adjust the polymer performance properties is the cross linking provides a practical means to evaluate and control various mineral separation solutions, e.g., consistent with that set forth in FIG. 1.

In the aforementioned graph, an economically viable solution space is indicated in the area where the mineral collection rate and polymer durability are both high, which is an important factor to consider during the fabrication of the collection surface.

Importance of Single Layer and Multi-Layer Polymer Film Thickness for Mineral Separation Using Functionalized Polymer According to some embodiments, the present invention provides a means or technique of controlling the tradeoff between the polymer mineral collection capability and the polymer lifetime, consistent with that set forth herein. A polymer formulation that has been optimized for mineral collection tends to be less cross linked and therefore is a less durably material. If the collected particles are removed from the surface mechanically then the lifetime of the polymer will be reduced each time collected mineral is removed. It has been demonstrated that a polymer that has been optimized for mineral collection can achieve the desired lifetime by enhancing its ability to release the collected mineral. By making it easier to release the mineral the required removal force is less thereby extending the polymers lifetime. This has been achieved by controlling the polymer layer thickness to a "thin" coating, (approximately<=125 um).

Thin film thicknesses are vulnerable to damage in an industrial environment. It has been demonstrated that multiple thin film layers will maintain the desired mineral collection capability and at the same time increasing the overall lifetime of the polymer surface.

Functionalized Polymer Adhesion in Mineral Separation Processes

According to some embodiments, the present invention provides a means or technique, of ensuring the polymer coating remains well adhered to the surface of the machine components, consistent with that set forth herein. In the case where the collected mineral particles are removed mechanically from the polymer surface it is important to ensure the polymer is tolerant to both cohesion and adhesion failures. It has been demonstrated that preparing the surface of the polymer substrate with a primer provides strong bonding between the substrate and the polymer.

Importance of Post Processing Cross Linked Polymer for Mineral Separation Using Functionalized Polymer According to some embodiments, the present invention provides a means or technique of post processing the cross linked polymer to remove the un-cross linked material, consistent with that set forth herein. This helps to increase the useful exposed surface area of the material. This can accomplished by washing the polymer surface with tetrahydrofuran, although the scope of the invention is intended to include other chemicals.

Examples of Particular Embodiments

By way of example, and consistent with the aforementioned, according to some embodiments the present invention may take the form of an article of manufacture and/or apparatus for recovering a mineral particle of interest from a slurry in a mineral extraction process, e.g., featuring a core or substrate; and multiple layers arranged on the core or substrate, each layer of the multiple layers configured with a respective outer surface having a plurality of molecules attached thereto, the molecules comprising a functional group selected for attracting and attaching one or more mineral particles of interest to the molecules.

The present invention may include one or more of the following features:

Each layer may be configured with a thickness of less than or equal to about 125 microns.

Each layer may be configured from a polymer.

The polymer may be selected from a group consisting of polydimethylsiloxane or dimethyl siloxane.

The multiple layers may be configured to encapsulate the core or substrate so as to form an engineered bead.

The multiple layers may include a multi-layer shell, each layer having an outer surface made of a synthetic material comprising the molecules.

The core or substrate may be selected from a group consisting of glass, ceramic, metal and a polymer that is different than the synthetic material.

The multiple layers may be configured to lay on top of the core or substrate so as to form as a belt.

The synthetic material may be selected from a group consisting of polyamides (nylon), polyesters, polyurethanes, phenol-formaldehyde urea-formaldehyde, melamine-formaldehyde, polyacetal, polyethylene, polyisobutylene, polyacrylonitrile, poly(vinyl chloride) polystyrene, poly(methyl methacrylates), poly(vinyl acetate), poly(vinylidene chloride), polyisoprene, polybutadiene, polyacrylates, poly(carbonate), phenolic resin and polydimethylsiloxane.

The functional group may include an anion for attracting the mineral particles of interest to the surface.

The functional group may be a collector that is either ionic or non-ionic.

The functional group may be anionic or cationic.

The anion may include an oxyhydryl, including carboxylic, sulfates and sulfonates, and sulfhydral bond.

The functional group may be configured to cause the surface to be hydrophobic.

The surface may be made of a polymer functionalized with the molecules so as to form a functionalized polymer surface, e.g., including where the polymer is selected from a group consisting of polystyrene, poly(d,l-lactide), poly (dimethylsiloxane), polypropylene, polyacrylic, polyethylene, polysiloxanates, silicone alkyd copolymer, and fluoroalkylsilane.

Each layer may include a combination of a cross linked polymer material and an un-cross link polymer material, and each layer may be responsive to being washed with tetrahydrofuran in order to remove the un-cross linked polymer material to help to increase the useful exposed surface area of the material. The un-cross linked polymer material being removed may form part of a top layer for attracting and attaching the one or more mineral particles of interest as the bead or belt wears, or may form at least part of a lower layer underneath the top layer for attracting and attaching the one or more mineral particles of interest as the bead or belt wears.

Only part of the surface may be configured to have the molecules attached thereto, wherein the molecules comprise collectors.

Another part of the surface may be configured to be hydrophobic.

A part of the surface may be configured to be hydrophobic.

The apparatus may include a primer layer arranged between the core or substrate and a first layer of the multiple layers.

One advantage of the present invention is that it provides a functionalized surface that has maximum surface area and yet will survive in an industrial environment. Moreover, the functionalized polymer surface is configured to be strong, wear resistant, and be able to pass large amount of rejected solids while capturing the value material.

BRIEF DESCRIPTION OF THE DRAWING

Referring now to the drawing, which are not drawn to scale, the foregoing and other features and advantages of the present invention will be more fully understood from the following detailed description of illustrative embodiments, taken in conjunction with the accompanying drawing in which like elements are numbered alike:

FIG. 1 is a graph showing mineral collection rate (low to high) versus polymer durability (low to high) having an indication of an economically viable solution space where the mineral collection rate is high and the polymer durability is high.

FIG. 2 shows a block diagram of examples of steps that form part of a mineral extraction process, according to some embodiments of the present invention.

FIG. 3A shows an engineered bead having multiple layers, each layer being less than or equal to about 125 microns, according to some embodiments of the present invention.

FIG. 3B shows flat plate or belt having multiple layers, each layer being less than or equal to about 125 microns, according to some embodiments of the present invention.

FIG. 4A shows an engineered bead having at least one primer layer between a core and a first layer, according to some embodiments of the present invention.

FIG. 4B shows a flat plate or belt having at least one primer layer between a core or substrate and a first layer, according to some embodiments of the present invention.

DETAILED DESCRIPTION OF THE INVENTION

By way of example, FIG. 2 shows at least part of a mineral extraction process generally indicated as 10 for implementing one or more of the embodiments of the present invention.

For example, the mineral extraction process 10 includes a step 12 for fabrication of a collection surface, a step 14 for conditioning of the collection surface, a step 16 for collection of the mineral particle of interest, and a step 18 for separating the mineral particle of interest from the collection surface. The steps 14, 16 and 18 are repeated throughout the mineral extraction process, e.g., at least until the specified recovery of the mineral particle of interest is achieved. Each is briefly described in relation to that set forth in FIG. 2.

Step 12: Fabrication of Collection Surface

By way of example, step 12 may be implemented for the fabrication of collection surface so as to form the functionalized polymer surface, and may include some combination of the following considerations:

1) Determining what material to use as a core or substrate material, e.g., depending on whether the present invention takes the form of an engineered bead or a flat plate or belt, consistent with that set forth in the aforementioned family of application.
2) Preparing the core of substrate surface, e.g., by considering the tradeoff between polymer performance properties vis-a-vis cross linking. Each layer may be comprised of a combination of a cross linked polymer material and are un-cross link polymer material, based upon the tradeoff determined, 3) Determining what material to use as a collecting material, e.g., depending on whether the present invention takes the form of an engineered bead or a flat plate or belt, consistent with that set forth in the aforementioned family of application.
4) Determine if priming is need between the core or substrate and the first layer, or any other layers. If so, then determining what primer to use, e.g., including using Silanes to promote adhesion between two non-bonding surfaces. In the case where the collected mineral particles are removed mechanically (see step 18) from the functionalized polymer surface, it is important to ensure the polymer is tolerant to both cohesion and adhesion failures. Preparing the surface of the polymer substrate with the primer provides a strong bonding between the substrate and the polymer. By way of example, a primer may consist of one or more reactive silanes, a condensation catalyst and some type of solvent carrier; reactive silanes are typically know to have two reactive groups: one that is compatible with the core or substrate and another that is compatible with an adhesive; and some types of groups may be hydrophilic, like a silanol group, or hydrophobic like a 1-octenyl group.
5) Curing each layer of the collecting material.
6) Forming a multiple layered structure of collecting material, e.g., forming a first thin coating or layer (<=125 microns), and forming multiple thin film coatings or layers on top of the first thin coating or layer.

The aforementioned implementation for fabrication of the collection surface is provided by way of example, and the scope of the invention is intended to include other types or kind of implementations for fabrication of the collection surface that are either now know or later developed in the future, e.g., consistent with the spirit of the underlying invention.

Step 14: Conditioning and/or Re-Conditioning of Functionalized Polymer Surface

By way of example, step 14 may be implemented for the conditioning and/or re-conditioning the functionalized polymer surface, and may include the following considerations: determining a cleaning technique that may take the form of chemical cleaning, e.g., using some solvent; or mechanical cleaning, e.g., using buffering; etc. The aforementioned implementation for the conditioning and/or re-conditioning the functionalized polymer surface is provided by way of example, and the scope of the invention is intended to include other types or kind of implementations for fabrication of the collection surface that are either now know or later developed in the future, e.g., consistent with the spirit of the underlying invention.

Step 16: Collection of Mineral Particles of Interest

By way of example, step 16 may be implemented for the collection of mineral particle of interest, and may include some combination of the following considerations: determining the particle size of the mineral particle of interest to be collected, the belt velocity for collecting the mineral particle of interest, and the wetting agent or flocculent (e.g., using Xanthane) and the concentration thereof. The aforementioned implementation for collection of the mineral particles of interest is provided by way of example, and the scope of the invention is intended to include other types or kind of implementations for fabrication of the collection surface that are either now know or later developed in the future, e.g., consistent with the spirit of the underlying invention.

Step 18: Separation of Mineral Particle of Interest from Functionalized Polymer Surface By way of example, step 18 may be implemented for the separation of mineral particle of interest from functionalized polymer surface, and may include some combination of the following considerations: determining a separation technique, including using mechanical separation (e.g., vibrating or washing polymer surface (with tetrahydrofuran)), or using chemical separation (e.g., changing pH), or using a physical separation condition (e.g., changing temperature). In effect, during this post processing, the functionalized polymer surface may be washed with tetrahydrofuran in order to remove un-cross linked polymer material to help to increase the useful exposed surface area of the material, e.g., by exposing other cross linked polymer material in the present layer as the bead or belt wears during the mineral extraction process, or by exposing other cross linked polymer material in the layer below the present layer after at least some part of the present layer has been completely used up as the bead or belt wears during the mineral extraction process. The aforementioned implementation for collection of the mineral particles of interest is provided by way of example, and the scope of the invention is intended to include other types or kind of implementations for fabrication of the collection surface that are either now know or later developed in the future, e.g., consistent with the spirit of the underlying invention.

FIG. 3: Single Layer and Multi-Layer Polymer Film Thickness for Mineral Separation Using Functionalized Polymer According to some embodiments of the present invention, the step 12 or fabrication of the collection surface may be implemented, include, or take the form of, using a functionalized polymer surface having a polymer layer thickness that is effectively a "thin" coating or layer, e.g. approximately less than of equal to about or approximately 125 um. Moreover, according to some embodiments of the present invention, multiple layers may be arranged on the core or substrate, each layer of the multiple layers configured with a respective outer surface having a plurality of molecules attached thereto, the molecules comprising a functional group selected for attracting and attaching one or more mineral particles of interest to the molecules. The multiple thin film layers may be configured so as to maintain the desired mineral collection capability, and at the same time increasing the overall lifetime of the polymer surface.

In particular, and by way of example, FIG. 3A shows an engineered bead 30 having a core or base substrate 30a, a first layer 30b, and one or more other layers 30c, 30d, 30e, so as to form so-called multiple layer structure. The core or substrate 30a may be configured or selected from a group consisting of glass, ceramic, metal and a polymer that is different than the molecules or synthetic material being used for the layers 30b, 30c, 30d, 30e. Each layer 30b, 30c, 30d, 30e may be configured with a respective outer surface, e.g., like element 30e', having the plurality of molecules attached thereto. The molecules may include the functional group selected for attracting and attaching the one or more mineral particles of interest to the molecules. Moreover, the scope of the invention is intended to include each layer in its entirety having the molecules with the functional group, as well as each layer in part, e.g., the outer surface like element 30e', having the molecules with the functional group. The aforementioned implementation shown in FIG. 3A is provided by way of example, and the scope of the invention is intended to include other types or kind of implementations, e.g., including multiple layer structures having two layers, three layers, consistent with the spirit of the underlying invention.

By way of further example, FIG. 3B shows part of a flat plate or belt 40 having a core or base substrate 40a, a first layer 40b, and one or more other layers 40c, 40d, 40e, so as to form a so-called multiple layer structure having n layers (where n is greater than 1). The core or substrate 40a may be configured or selected from a group consisting of a durable belt material like a rubber, a synthetic composite material or a polymer, e.g., that is different than the molecules or synthetic material being used for the layers 40b, 40c, 40d, 40e. The durable belt material would be understood to be able to withstand, e.g., the forces associated with being driven via a pulley system, etc., consistent with that set forth in one or more of the applications in the aforementioned family. Each layer 40b, 40c, 40d, 40e may be configured with a respective outer surface like element 40e' having the plurality of molecules attached thereto. The molecules may include the functional group selected for attracting and attaching the one or more mineral particles of interest to the molecules. Moreover, the scope of the invention is intended to include each layer in its entirety having the molecules with the functional group, as well as each layer in part, e.g., the outer surface like element 40e', having the molecules with the functional group. The aforementioned implementation shown in FIG. 3B is provided by way of example, and the scope of the invention is intended to include other types or kind of implementations, e.g., including multiple layer structures having two layers, three layers, etc., consistent with the spirit of the underlying invention.

By way of skill further example, FIG. 4A shows an engineered bead 50 having a core or base substrate 50a, a primer layer 50b, a first layer 50c and one or more other layers 50d, 50e, so as to form a so-called multiple layer structure.

The primer layer 50b may include or take the form of, silanes to promote adhesion between two nonbonding surfaces, e.g., like the core 50a and the first layer 50c. The primer layer 50a provides a strong bonding between the core or base substrate 50a and the first functionalized polymer layer 50c.

Consistent with that set forth re FIG. 3A, each layer 50c, 50d, 50e may be configured with a respective outer surface like element 50e' having the plurality of molecules attached thereto. The molecules may include the functional group selected for attracting and attaching the one or more mineral particles of interest to the molecules. Moreover, the scope of the invention is intended to include each layer in its entirety having the molecules with the functional group, as well as each layer in part, e.g., the outer surface like element 50e', having the molecules with the functional group. The aforementioned implementation shown in FIG. 4A is provided by way of example, and the scope of the invention is intended to include other types or kind of implementations, including multiple layer structures having two layers, three layers, etc., consistent with the spirit of the underlying invention.

By way of still further example, FIG. 4B shows part of a flat plate or belt 60 having a core or base substrate 60a, a primer layer 60b, a first layer 60c, and one or more other layers 60d, 60e, so as to form a so-called multiple layer structure having n layers (where n is greater than 1).

Consistent with that set forth above, the primer layer 60b may include, or take the form of, silanes to promote adhesion between two nonbonding surfaces, e.g., like the core 60a and the first layer 60c. The primer layer 60a provides a strong bonding between the core or base substrate 60a and the first functionalized polymer layer 60c.

The scope of the invention is not intended to be limited to any particular type or kind of primer or primer material, and embodiment are envisioned, and the scope of the invention is intended to include, using other types or kinds of primers or primer material that are now known or later developed in the future.

Moreover, and by way of example, techniques for applying a primer layer like element 50b or 60b to another material like the element 50a or 60a are known in the art, and the scope of the invention is not intended to be limited to any particular type or kind of technique for applying the same.

Examples of Mineral Extraction Processes

As described herein, the present invention may be implemented in relation to a mineral extraction process, e.g., like ore mining that is typically associated with copper and nickel. However, other types or kinds of valuable material or minerals of interest, including gold, molybdenum, etc.

Moreover, the scope of the invention is intended to include other types or kinds of applications either now known or later developed in the future.

Silicone Gel

By way of example, one or more of the aforementioned layers 30b, 30c, 30d, 30e; 40b, 40c, 40d, 40e; 50c, 50d, 50e; and 60c, 60d, 60e may be configured in whole or in part using a silicone gel, e.g., for collecting the valuable material of interest of a wide range of sizes, including particles as large or larger than about 500 microns. The silicone gel may include, or take the form of, molecules having the siloxane functional group, e.g., including a siloxane that is, or may take the form of, a functional group in organosilicon chemistry with the Si—O—Si linkage. By way of example, parent siloxanes may include, or take the form of, oligomeric and polymeric hydrides with the formulae $H(OSiH_2)_nOH$ and $(OSiH_2)_n$. The scope of the invention is also intended to include other types or kinds of siloxanes either now known or later developed in the future, e.g., including branched compounds, where the defining feature includes each pair of silicon centers being separated by one oxygen atom. In one embodiment of the present invention, and set forth by way of example, the silicone gel may take the form of a product from Dow-Corning® Corporation, Midland, Mich. 48686-0994, USA, e.g., labeled as product no. 2986922-1104 (Lot: 0007137499), that is sold in a combination that includes 3-4222 Dielectric Firm Gel Part A and 3-4222 Dielectric Firm Gel Part B. The gel comes with two parts. Part A includes dimethyl siloxane, dimethylvinyl-terminated—68083-19-2; polydimethylsiloxane (PDMS)—63148-62-9; reaction of ethylene glycol and silica—170424-65-4; hydrotreated light naphthenic petroleum distillate—64742-53-6. Part B includes dimethyl siloxane, dimethylvinyl-terminated—68083-19-2; polydimethylsiloxane—63148-

62-9; dimethyl siloxane, hydrogen-terminated—none; trimethylated silica—68909-20-6; dimethyl, methylhydrogen siloxane—68037-59-2.

The Scope of the Invention

It should be further appreciated that any of the features, characteristics, alternatives or modifications described regarding a particular embodiment herein may also be applied, used, or incorporated with any other embodiment described herein. Although the invention has been described and illustrated with respect to exemplary embodiments thereof, the foregoing and various other additions and omissions may be made therein and thereto without departing from the spirit and scope of the present invention.

What is claimed is:

1. Apparatus for recovering a mineral particle of interest from a slurry in a mineral extraction process, comprising:
    a core or substrate; and
    multiple layers arranged on the core or substrate, one layer disposed on top of another layer, each layer of the multiple layers configured with a respective outer surface having a plurality of molecules attached thereto, the molecules comprising a functional group selected for attracting and attaching one or more mineral particles of interest to the molecules.

2. Apparatus according to claim 1, wherein said each layer is configured with a thickness of less than or equal to 125 microns.

3. Apparatus according to claim 1, wherein said each layer is configured from a polymer.

4. Apparatus according to claim 3, wherein the polymer is selected from a group consisting of polydimethylsiloxane or dimethyl siloxane.

5. Apparatus according to claim 1, wherein the multiple layers are configured to encapsulate the core or substrate so as to form an engineered bead.

6. Apparatus according to claim 5, wherein the multiple layers comprise a multi-layer shell, each layer having an outer surface made of a synthetic material comprising the molecules.

7. The apparatus according to claim 6, wherein the synthetic material is selected from a group consisting of polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin and polydimethylsiloxane.

8. Apparatus according to claim 6, wherein the core or substrate is selected from a group consisting of glass, ceramic, metal and a polymer that is different than the synthetic material.

9. Apparatus according to claim 1, wherein the multiple layers are configured to lay on top of the core or substrate so as to form as a belt.

10. Apparatus according to claim 9, wherein the multiple layers comprise a multi-layer belt, each layer having an outer surface made of a synthetic material comprising the molecules.

11. Apparatus according to claim 10, wherein the synthetic material is selected from a group consisting of polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin and polydimethylsiloxane.

12. Apparatus according to claim 1, wherein the functional group has an anion for attracting the mineral particles of interest to the surface.

13. Apparatus according to claim 1, wherein the functional group is a collector that is either ionic or non-ionic.

14. Apparatus according to claim 13, wherein the functional group is anionic or cationic.

15. Apparatus according to claim 14, wherein the anion comprises an oxyhydryl, including carboxylic, sulfates and sulfonates, and or a sulfhydral bond.

16. Apparatus according to claim 1, wherein the functional group is configured to cause the surface to be hydrophobic.

17. Apparatus according to claim 16, wherein the surface is made of a polymer functionalized with the molecules so as to form a functionalized polymer surface, wherein the polymer is selected from a group consisting of polystyrene, poly(d,l-lactide), poly(dimethylsiloxane), polypropylene, polyacrylic, polyethylene, polysiloxanates, silicone alkyd copolymer, and fluoroalkylsilane.

18. Apparatus according to claim 1, only said at least part of the surface is configured to have the molecules attached thereto, wherein the molecules comprise collectors.

19. Apparatus according to claim 18, wherein another part of the surface is configured to be hydrophobic.

20. Apparatus according to claim 1, wherein a part of the surface is configured to be hydrophobic.

21. Apparatus according to claim 1, wherein the apparatus comprises a primer layer arranged between the core or substrate and a first layer of the multiple layers.

* * * * *